No. 789,438. Patented May 9, 1905.

UNITED STATES PATENT OFFICE.

FLORENTINE J. MACHALSKE, OF BROOKLYN, NEW YORK, ASSIGNOR TO FREDERICK DARLINGTON, OF GREAT BARRINGTON, MASSACHUSETTS.

PROCESS OF TREATING PHOSPHATE-ROCK.

SPECIFICATION forming part of Letters Patent No. 789,438, dated May 9, 1905.

Application filed February 25, 1905. Serial No. 247,342.

*To all whom it may concern:*

Be it known that I, FLORENTINE J. MACHALSKE, a citizen of the United States, residing in the borough of Brooklyn, in the county of Kings and State of New York, have invented certain new and useful Improvements in Processes of Treating Phosphate-Rock, of which the following is a specification.

According to this process rock containing tricalcium phosphate, especially low-grade rock having a phosphate contents of below seventy and down to fifty per cent., is crushed and mixed with an alkali-metal chlorid and carbon and the mixture is heated to a temperature sufficient to decompose the rock and effect the production of phosphoric chlorid and calcium and sodium carbids. The preferred mixture consists of the crushed rock, sodium chlorid, and an excess of carbon in the form of broken coke, and the smelting is preferably effected in an electric furnace. The charge should be free from water, and air is excluded from the furnace. The reaction is represented by the following equation:

(1.) 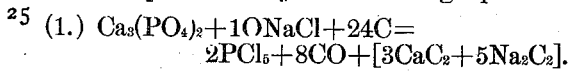
$$Ca_3(PO_4)_2 + 10NaCl + 24C =$$
$$2PCl_5 + 8CO + [3CaC_2 + 5Na_2C_2].$$

The heating may be effected in an electric furnace, either of the arc or resistance type. An electric current, preferably alternating, of from two thousand amperes at fifty volts to two thousand five hundred amperes at forty volts is sufficient for a furnace of the usual size. The resulting phosphoric chlorid is led off from the furnace and may be treated with water for the production of phosphoric and hydrochloric acids. The calcium-sodium carbids may be treated with water for the production of acetylene, calcium hydroxid, and sodium hydroxid.

I claim—

1. The process of treating rock containing calcium phosphate, which consists in heating to a high temperature a mixture of the rock, an alkali-metal chlorid and carbon, thereby producing a chlorid of phosphorus and carbids of calcium and the alkali metal, as set forth.

2. The process of treating rock containing calcium phosphate, which consists in heating to a high temperature a mixture of the rock, sodium chlorid and an excess of carbon, thereby producing phosphoric chlorid and carbids of calcium and sodium, as set forth.

3. The process of treating rock containing calcium phosphate, which consists in electrically heating to a high temperature a mixture of the rock, an alkali-metal chlorid and carbon, thereby producing a chlorid of phosphorus and carbids of calcium and the alkali metal, as set forth.

4. The process of treating rock containing calcium phosphate, which consists in electrically heating to a high temperature a mixture of the rock, sodium chlorid and an excess of carbon, thereby producing phosphoric chlorid and carbids of calcium and sodium, as set forth.

In testimony whereof I affix my signature in presence of two witnesses.

FLORENTINE J. MACHALSKE.

Witnesses:
JNO. B. CAMPBELL,
WM. P. MITCHELL.